Figure 1:
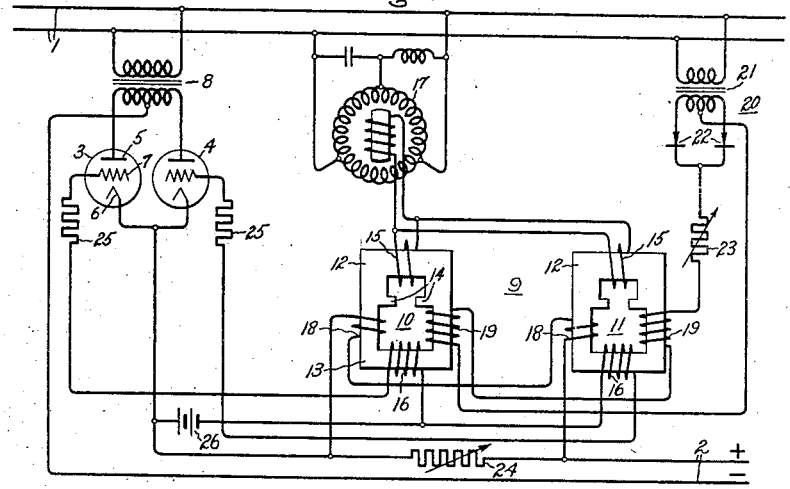

Dec. 28, 1937.   B. D. BEDFORD   2,103,997
ELECTRIC CONTROL CIRCUIT
Filed Dec. 9, 1936   4 Sheets-Sheet 1

Inventor:
Burnice D. Bedford,
by Harry E. Dunham
His Attorney.

Dec. 28, 1937.                B. D. BEDFORD                2,103,997
                          ELECTRIC CONTROL CIRCUIT
                           Filed Dec. 9, 1936              4 Sheets-Sheet 3

Inventor:
Burnice D. Bedford,
by Harry E. Dunham
His Attorney.

Dec. 28, 1937.  B. D. BEDFORD  2,103,997
ELECTRIC CONTROL CIRCUIT
Filed Dec. 9, 1936    4 Sheets-Sheet 4

Inventor:
Burnice D. Bedford,
by Harry E. Dunham
His Attorney.

Patented Dec. 28, 1937

2,103,997

UNITED STATES PATENT OFFICE 2,103,997

ELECTRIC CONTROL CIRCUIT

Burnice D. Bedford, Schenectady, N. Y., assignor to General Electric Company, a corporation of New York Application December 9, 1936, Serial No. 114,998

13 Claims. (Cl. 175—363)

My invention relates to electric circuits and more particularly to circuits for controlling electric valve means.

This application is a continuation in part of my copending application Serial No. 4,480, filed February 1, 1935, entitled "Constant current magnetic bridge" and assigned to the assignee of the present application.

In the control of electric circuits, particularly in the control of electric valve apparatus, it is frequently desirable to provide an alternating voltage which varies in phase relative to a predetermined voltage to effect the desired control. Heretofore where it has been desirable to provide an alternating voltage which varied in phase relative to a reference voltage conjointly in accordance with a number of different predetermined electrical conditions, it has been necessary to employ apparatus which has been complicated in construction and arrangement and which has been of inordinate proportions relative to the size and rating of the equipment to be controlled. In view of these facts, it has become apparent that there is a decided need for control apparatus capable of performing the above mentioned functions in a precise and reliable manner without involving expensive or complicated equipment.

It is an object of my invention to provide a new and improved electric control circuit.

It is another object of my invention to provide a new and improved phase shifting circuit.

It is a further object of my invention to provide a new and improved circuit for supplying an alternating voltage of peaked wave form variable in phase for controlling electric valve means.

It is a still further object of my invention to provide a new and improved voltage regulating system.

In accordance with the illustrated embodiments of my invention, I provide an inductive device for supplying an alternating voltage of peaked wave form, the phase of which is controllable relative to a predetermined alternating voltage conjointly in accordance with two or more controlling influences. In particular, I provide an inductive device including a core member having a saturable portion with which there is associated a winding for providing a voltage of peaked wave form. By means of an exciting winding connected to be energized from a source of alternating current, there is impressed on the core member an alternating magnetomotive force, and the phase of the alternating voltage of peaked wave form is controlled relative to the voltage of the source by controlling the amount of resultant unidirectional flux in the core member. A pair of oppositely disposed windings are associated with the core member to impress thereon opposing unidirectional magnetomotive forces, the difference of which determines the resultant unidirectional flux in the core member and hence determines the phase of the alternating voltage of peaked wave form relative to the voltage of the source.

For a better understanding of my invention, reference may be had to the following description taken in connection with the accompanying drawings and its scope will be pointed out in the appended claims.

Figure 3:
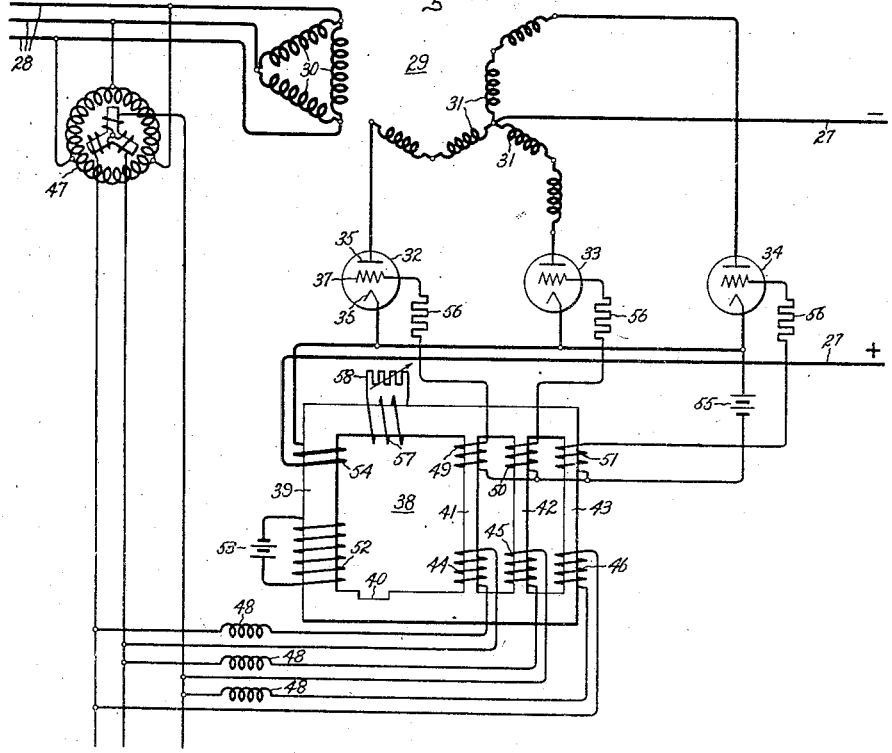
Figure 2:
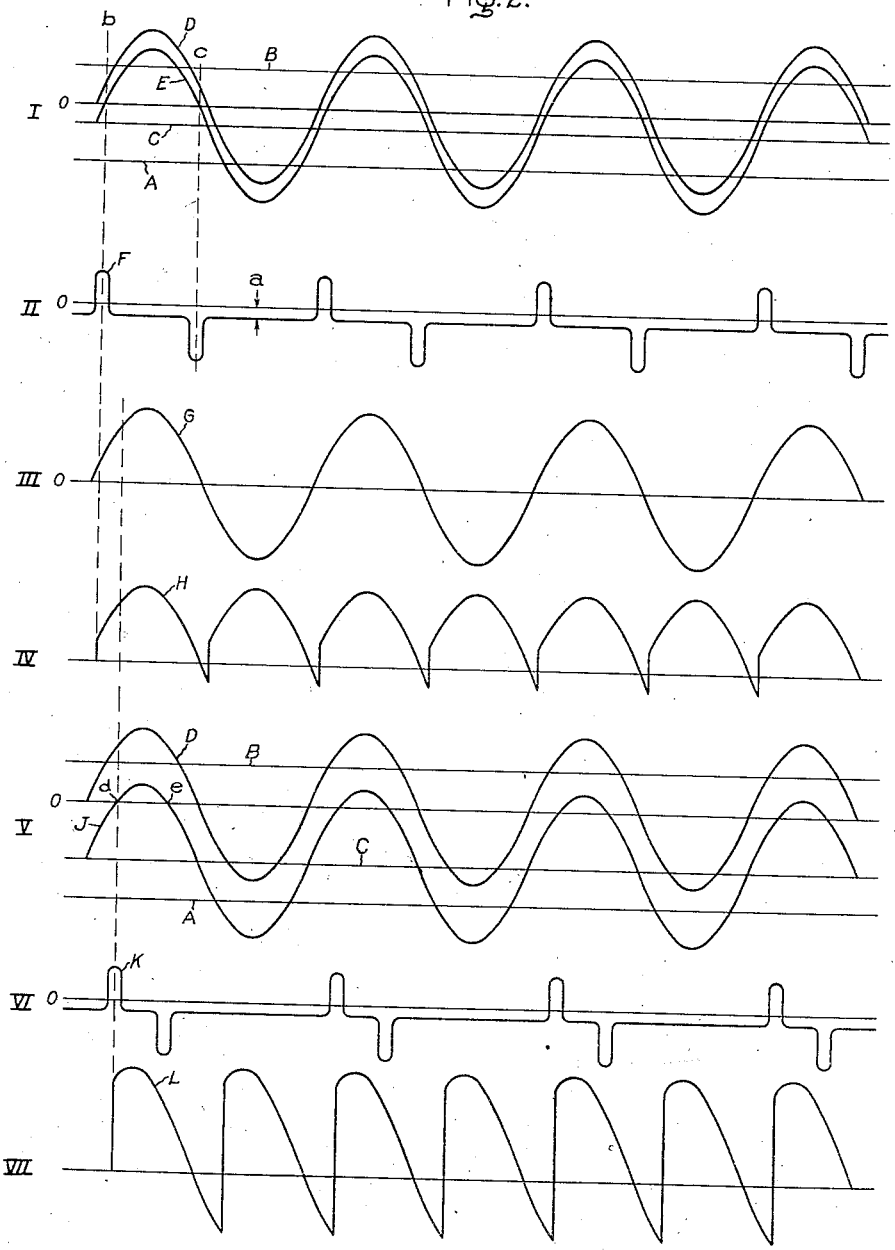
Figure 4:
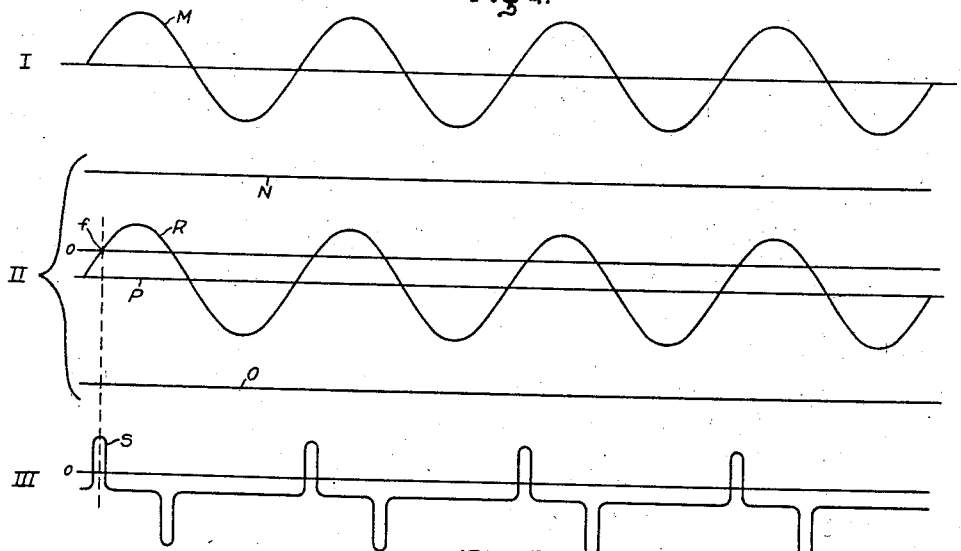
Figure 5:
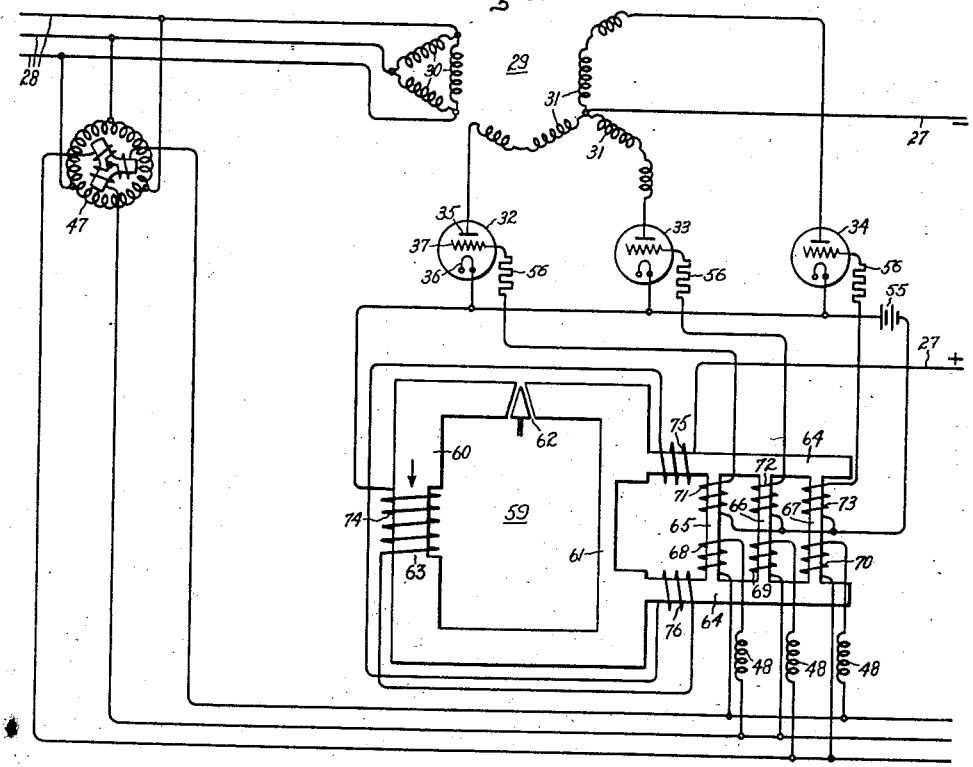
Figure 6:
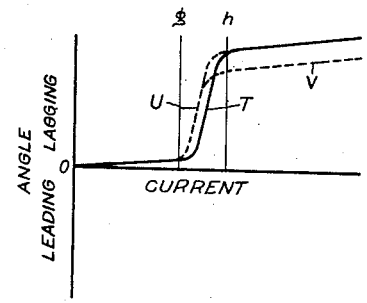
Figure 8:
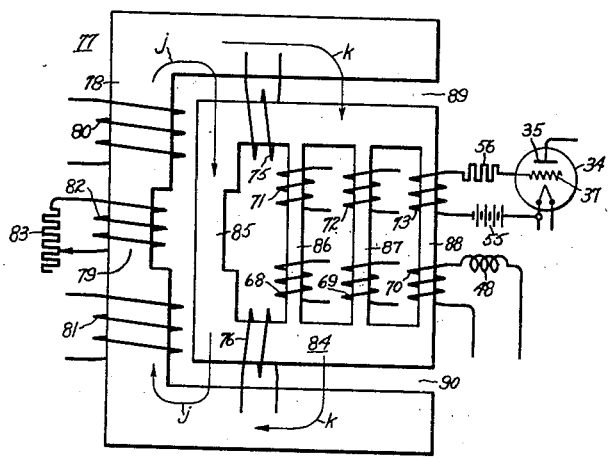
Figure 7:
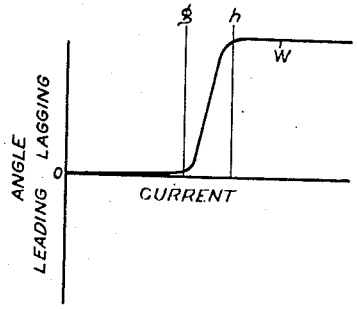

Fig. 1 of the accompanying drawings diagrammatically shows an embodiment of my invention as applied to a voltage regulating system employing electric valve means and Fig. 2 represents certain operating characteristics thereof. Fig. 3 diagrammatically illustrates another embodiment of my invention as applied to a control circuit for controlling electric valve means for supplying constant current to a constant current direct current circuit, and Fig. 4 represents certain operating characteristics of the control circuit shown in Fig. 3. Figs. 5 and 8 show modified control circuits for controlling electric valve means, and Figs. 6 and 7 represent certain operating characteristics thereof.

Fig. 1 of the accompanying drawings diagrammatically shows an embodiment of my invention as applied to an electric valve translating system for transmitting energy between an alternating current circuit 1 and a direct current circuit 2 through electric valve means 3 and 4. The electric valve means 3 and 4 are preferably of the type employing an ionizable medium such as a gas or a vapor and each includes an anode 5, a cathode 6 and a control member 7. A transformer 8 is interposed between the electric valve means 3 and 4 and the alternating current circuit 1 and impresses alternating voltages on the respective anodes 5 thereof.

In order to control the conductivity of the electric valve means 3 and 4, or in other words to control the voltage of the direct current circuit 2 conjointly in accordance with two different controlling influences such as the voltage of the alternating current circuit 1 and the current of the direct current circuit 2, I provide a control circuit 9 including inductive devices 10 and 11. Each of the inductive devices 10 and 11 includes a core member 12 having a nonlinear saturable path 13 and a shunt path 14 which bridges the saturable path 13. Each of the inductive devices 10 and 11 includes a winding 15 which impresses on the associated core member 12 an alternating magnetomotive force and a winding 16 associated with the saturable portion or path 13 in which there is induced an alternating voltage of peaked wave form. Windings 15 may be energized from any suitable source of alternating current properly correlated in phase and frequency with the voltages impressed on anodes 5 of electric valve means 3 and 4. In the arrangement of my invention shown in Fig. 1, I have chosen to show the windings 15 as being energized from the alternating current circuit 1 through any conventional phase shifting arrangement such as the rotary phase shifter 17. As a means for impressing on the core member 12 of inductive devices 10 and 11 a resultant unidirectional magnetomotive force, the magnitude of which varies conjointly in accordance with two different controlling influences, I provide windings 18 and 19 which are oppositely disposed relative to the core member 12. To supply to the winding 19 a direct current the magnitude of which varies in accordance with the voltage of the alternating current circuit 1, I employ any suitable arrangement such as a conventional biphase rectifier 20 including a transformer 21 and unidirectional conducting devices 22, and a current controlling means such as an adjustable resistance 23. It will be understood that the windings 19 of inductive devices 10 and 11 may be energized in series relation or in parallel relation, and in the arrangement shown in Fig. 1, I have shown the windings 19 connected in series relation. Windings 18 of inductive devices 10 and 11 are energized in accordance with the voltage appearing across an adjustable resistance 24 which is connected in series relation with the direct current circuit 2, thereby providing an arrangement for controlling the energization of the windings 18 in accordance with the load current of circuit 2. Windings 18 of inductive devices 10 and 11 are shown as being connected in series relation with each other.

The alternating voltages of peaked wave form are impressed on control members 7 of electric valve means 3 and 4 through current limiting resistance 25. In order to impress on the control members 7 and 8 a suitable negative biasing potential, I employ any suitable arrangement such as a battery 26.

The operation of the embodiment of my invention diagrammatically shown in Fig. 1 will be explained by considering the electric translating system when energy is being transmitted from the alternating current circuit 1 to the direct current circuit 2 through transformer 8 and electric valve means 3 and 4. It will be understood that the electric valve means 3 and 4 will conduct current to supply the direct current circuit 2 with current at a predetermined voltage which depends on the phase relationship between the voltages impressed on the control members 7 and the voltages impressed on the anodes 5. When there is substantial phase opposition between the voltages impressed on the control members 7 and the voltages impressed on the associated anodes 5, the voltage impressed on the circuit 2 by electric valve means 3 and 4 will be substantially zero, and when there is a substantial phase coincidence between the voltages impressed on the control members 7 and the voltages impressed on the associated anodes 5, the voltage impressed on circuit 2 by electric valve means 3 and 4 will be maximum. For intermediate phase positions the voltages impressed on the direct current circuit 2 will, of course, assume corresponding intermediate values. If it be assumed that it is desired to maintain the voltage impressed on the direct current circuit 2 within a predetermined range of values, this result may be effected by controlling the conductivity of electric valve means 3 and 4 conjointly in accordance with the voltage of the alternating current circuit 1 and the current of the direct current circuit 2.

The inductive devices 10 and 11 provide voltages of peaked wave form due to the design of the core member 12. The saturable paths 13 are designed to become saturated at a value of voltage impressed on the winding 15 substantially less than the maximum value of voltage. When the saturable paths 13 become saturated, the paths 14 operate to shunt the saturable paths 13 so that the flux in the saturable paths 13 remains substantially constant during the greater portion of each half cycle of alternating voltage. The shift in phase of the voltage induced in winding 16 relative to the voltage of circuit 1 is effected by controlling the resultant unidirectional flux in the core member 12. In other words, the control of the resultant unidirectional flux in the core members 12 varies the times of the occurrence of the maximum instantaneous values of the voltage of peaked wave form induced in the winding 16.

Referring to the operating characteristics shown in Fig. 2, line A of Diagram I represents the unidirectional magnetomotive force impressed on one of the core members, for example core member 12 of inductive device 10, by winding 19. The magnitude of this unidirectional magnetomotive force may be controlled or adjusted by means of the adjustable resistance 23 or by the design of the winding 19. Line B represents the opposing unidirectional magnetomotive force impressed on the core member 12 by winding 18. The magnitude of this magnetomotive force may, of course, be adjusted or controlled by means of the adjustable resistance 24 or by the design of the winding 18. Line C represents the resultant unidirectional magnetomotive force or the difference in the unidirectional magnetomotive forces due to windings 18 and 19. Curve D represents the alternating magnetomotive force impressed on core member 12 by winding 15. The phase position of this magnetomotive force relative to the voltage impressed on the anodes 5 of electric valve means 3 and 4 may be adjusted by means of the rotary phase shifter 17. Curve E represents the resultant magnetomotive force impressed on the core member 12. Curve F of Diagram II represents the voltage of peaked wave form induced in winding 16 of inductive device 10 and is the voltage impressed on control member 7 of electric valve means 3. It will be understood that a corresponding voltage displaced in phase by 180 electrical degrees will be impressed on control member 7 of electric valve means 4 by winding 16 of inductive device 11. The displacement $a$ of curve F in Diagram II is caused by the unidirectional biasing potential due to battery 26. Curve G of Diagram III represents the alternating voltage impressed on one of the electric valve means, for example the voltage impressed on anode 5 of electric valve means 3. It will be understood that the voltage impressed on anodes 5 of electric valve means 3 and 4 will be displaced by 180 electrical degrees relative to the voltage represented by curve G. The voltage of peaked wave form as represented by curve F will be induced in the winding 16 at the times corresponding to the positions of lines $b$ and $c$, which are the times when the resultant magnetomotive force in the core member 12 of inductive device 10 passes through the zero value. The negative peak of voltage does not enter into the operation of the electric valve means. Curve H of Diagram IV represents the resultant voltage impressed on the direct current circuit 2 by electric valve means 3 and 4.

If the voltage of the alternating current circuit 1 increases beyond a predetermined range of values, the control circuit 9 will respond to retard the phase of the voltages impressed on control members 7 of electric valve means 3 and 4 relative to the voltages impressed on the anodes 5 so that the voltage impressed on the direct current circuit 2 remains substantially constant. Referring to Diagram V of Fig. 2, the line A is shown as representing an increased unidirectional magnetomotive force due to the increase in voltage of the alternating current circuit 1, and the line C which is the resultant unidirectional magnetomotive force, represents the difference in the magnetomotive forces due to windings 19 and 18, and is shown as being displaced by a larger negative value below the zero axis than that indicated in Diagram I. As a result thereof, the curve J, which represents the resultant magnetomotive force impressed on the core member 12, has been lowered relative to the zero axis, so that the zero values of magnetomotive force occur at points $d$ and $e$ at which times the voltages of peaked wave form are induced in winding 16. The voltage of peaked wave form as represented by curve K of Diagram VI represents the voltage of peaked wave form as retarded by the increased unidirectional magnetomotive force. As a result thereof, the electric valves 3 and 4 will be rendered conductive at a later time during each half cycle of alternating voltage as represented by curve L of Diagram VII to maintain the average voltage impressed on the direct current circuit 2 substantially constant.

On the other hand, if the voltage of the alternating current circuit 1 remains substantially constant and the current in the direct current circuit 2 increases beyond a predetermined range of values so that the voltage of the direct current circuit 2 tends to decrease, the control circuit 9 will respond to advance the phase of the voltages impressed on control members 7 of electric valves 3 and 4, so that the voltage impressed by these electric valve means is increased to compensate for the additional voltage drop. More specifically, as the load current in the circuit 2 increases, the unidirectional magnetomotive force due to the windings 18 will increase to effect a decrease in the value of the resultant unidirectional magnetomotive force in the core members 12 of inductive devices 10 and 11 to advance the time during each half cycle of voltage at which the resultant magnetomotive forces pass through the zero values, so that the voltages of peaked wave form are advanced in phase relative to the voltages impressed on the anodes 5 of electric valve means 3 and 4, thereby maintaining the voltage of circuit 2 substantially constant.

Referring now to Fig. 3 of the accompanying drawings, another embodiment of my invention is shown as applied to an electric valve translating system for supplying direct current of constant value to a circuit 27 from a three phase alternating current circuit 28 through a transformer 29, having primary windings 30 and secondary windings 31, and electric valve means 32, 33 and 34. Electric valve means 32, 33, and 34 are preferably of the type employing an ionizable medium such as a gas or a vapor, and each includes an anode 35, a cathode 36 and a control member 37.

As a means for impressing on the control members 37 of electric valve means 32, 33 and 34 alternating voltages of peaked wave form which vary in phase relationship conjointly in accordance with two controlling influences, I provide a device 38 including a core member 39 having a restricted saturable portion 40 and having a plurality of saturable parallel paths 41, 42 and 43. The restricted section 40 limits the amount of unidirectional magnetomotive force impressed on the saturable paths 41, 42 and 43. To impress on each of the saturable paths 41, 42, and 43 an alternating magnetomotive force, I employ windings 44, 45 and 46, respectively, which are energized from any suitable three phase source of alternating current of proper phase and frequency. In the arrangement of Fig. 3, these windings are shown as being energized from the alternating current circuit 28 through any conventional phase shifting arrangement such as the rotary phase shifter 47. Smoothing and current limiting inductances 48 are connected in series relation with the windings 44, 45 and 46. I provide windings 49, 50 and 51 associated with saturable paths 41, 42 and 43, respectively, which serve to impress on control members 37 of electric valve means 32, 33 and 34 alternating voltages of peaked wave form, the phase positions of which relative to the voltage impressed on anodes 35 are controllable in accordance with the unidirectional flux in the core member 39. A winding 52 impresses on the core member 39 a unidirectional magnetomotive force the value of which is substantially constant. The winding 52 may be energized from any suitable source of substantially constant voltage and current, such as a battery 53.

A control winding 54, which is oppositely disposed relative to the winding 52, impresses on the core member 39 a unidirectional magnetomotive force in opposition to the unidirectional magnetomotive force of winding 52 and serves to control the amount of unidirectional flux in the core member 39 and hence serves to control the phase of the alternating voltages of peaked wave form induced in windings 49, 50 and 51. A negative biasing potential is impressed on control members 37 of electric valves 32, 33 and 34 by any suitable means such as a battery 55 and current limiting resistances 56 are connected in series relation with the control members 37 and the associated windings 49, 50 and 51.

A winding 57 is associated with the core member 39 to control the rate of change of flux in the core member 39 so that the shift in phase of the voltages induced in windings 49, 50 and 51 is a function of the average difference in the magnetomotive forces due to windings 52 and 54. The winding 57 is short circuited and an adjustable resistance 58 may be connected across the terminals of the winding 57 to control the amount of damping occasioned by the winding 57. By this arrangement including the winding 57 and the adjustable resistance 58, the shift in phase of the voltages impressed on control members 37 of electric valve means 32, 33 and 34 relative to the voltages impressed on anodes 35 is made responsive to average changes in the variation of the load current in circuit 27 rather than being responsive to transient high frequency changes of current which may be present in the direct current circuit 27.

The operation of the embodiment of my invention diagrammatically shown in Fig. 3 will be considered when the system is operating to supply a substantially constant current to the direct current circuit 27. The conductivity of the electric valve means 32, 33 and 34 will be controlled by the device 38 so that a predetermined value of current is maintained in the circuit 27 irrespective of variations in the resistance of the load connected to circuit 27. Referring to Fig. 4 which shows certain operating characteristics of the arrangement of Fig. 3, curve M of Diagram I represents the alternating magnetomotive force impressed on one of the saturable paths as, for example, the magnetomotive force impressed on saturable path 41 by winding 44. In Diagram II of Fig. 4 line N represents the unidirectional magnetomotive force of substantially constant value which is impressed on the core member 39 by winding 52, and line O represents the unidirectional magnetomotive force impressed on core member 39 by the control winding 54 and which varies in accordance with the current supplied to the direct current circuit 27. Line P represents the resultant unidirectional magnetomotive force impressed on core member 39, or, in other words, the difference of the magnetomotive forces due to windings 52 and 54. Curve R represents the resultant magnetomotive force in the saturable path 41. At the times corresponding to the point *f*, where the resultant magnetomotive force in the saturable path 41 passes through zero, there will be induced in the winding 49 a voltage of peaked wave form as represented by curve S of Diagram III. Of course, it will be understood that the voltages induced in the windings 49, 50 and 51 will be displaced in phase in accordance with the conventional three phase system of voltages since the windings 44, 45 and 46 are energized from a three phase circuit.

If the current in the direct current circuit 27 tends to increase above a predetermined value, the magnetomotive force as represented by curve O of Diagram II in Fig. 4 will be increased to a larger negative value so that the phase positions of the voltages of peaked wave form will be retarded relative to the anode voltages to effect a decrease in the voltage impressed on the direct current circuit 27, thereby effecting a reduction in the current supplied thereto. Conversely, if the current in the direct current circuit 27 tends to decrease to a value below the predetermined value for which the device 38 is initially adjusted, the phase positions of the voltages induced in the windings 49, 50 and 51 will be advanced relative to the voltages impressed on the anodes 35 of electric valves 32, 33 and 34, so that the voltage impressed on the direct current circuit 27 will be increased to maintain the current therein at the predetermined value.

In Fig. 5 of the accompanying drawings there is diagrammatically shown another embodiment of my invention as applied to an electric valve translating system which is substantially the same as that shown in Fig. 3, and corresponding elements have been assigned like reference numerals. The conductivity of the electric valves 32, 33 and 34 is controlled by a device 59 which impresses on the control members 37 alternating voltages of peaked wave form the phase positions of which vary relative to the anode voltages in accordance with an electrical condition, such as the current of the load circuit 27, to maintain the current at a substantially constant value. The device 59 is provided with a core member 60 having a restricted saturable portion 61, an adjustable air gap 62 and a second restricted section 63. In shunt relation and bridging the restricted saturable portion 61, I provide a pair of yoke members 64 joined by a plurality of saturable paths 65, 66 and 67. Windings 68, 69 and 70 impress on saturable paths 65, 66 and 67, respectively, alternating magnetomotive forces and are energized from any suitable three phase source of alternating current such as the three phase output circuit of the rotary phase shifter 47. Associated with the saturable paths 65, 66 and 67, I provide windings 71, 72 and 73 in which are induced alternating voltages of peaked wave form having a conventional three phase relationship and which serve to control the conductivity of the electric valve means 32, 33 and 34 by impressing on the control members 37 thereof voltages of peaked wave form variable in phase. A winding 74 is employed to impress on the core member 60 a unidirectional magnetomotive force which varies in accordance with the current in the direct current circuit 27. The winding 74 may be placed on the core member 60 in the vicinity of the restricted section 63. In order to obtain a precise control of the alternating voltages induced in windings 71, 72, and 73, I employ windings 75 and 76 which are associated with the yoke members 64 to impress thereon unidirectional magnetomotive forces opposing the unidirectional magnetomotive force established by the winding 74.

The operation of the embodiment of my invention diagrammatically shown in Fig. 5 may be best understood by considering the system when energy is being transmitted from the alternating current circuit 28 to the direct current circuit 27. If it is desired to maintain the current in the circuit 27 at a substantially constant value, the device 59 may be adjusted to effect this desired control. Furthermore, let it be assumed that the device 59 is designed or adjusted so that for values of current in the direct current circuit 27 below a predetermined value the unidirectional component of magnetomotive force impressed across the yoke member 64 is substantially zero. Considering the operating characteristics represented in Fig. 6, curve T represents the variation in the phase of the voltages induced in windings 71, 72 and 73 as a function of the current in the direct current circuit 27. By the proper design of the device 59, the current in the direct current circuit 27 may be maintained within the region lying between the lines *g* and *h*. As the current in the direct current circuit 27 increases to a value beyond the line *g*, the saturable restricted section 61 will become saturated due to the nonlinearity thereof effecting thereby a rapid or abrupt transfer of unidirectional flux through the shunt or bridging part of the device 59 comprising the yoke members 64 and the saturable paths 65, 66 and 67. As a result thereof, the phase positions of the alternating voltages of peaked wave form induced in the members 71, 72 and 73 will be rapidly shifted and in the particular arrangement shown these voltages will be rapidly retarded in phase relative to the voltages impressed on anodes 35 of electric valve means 32, 33 and 34. This retardation in phase of the alternating voltage of peaked wave form impressed on the control members 37 will effect a decrease in the conductivity of electric valves 32, 33 and 34 and hence will effect a reduction in the voltage which these valves impress on the direct current circuit 27 to maintain a current therein within a predetermined range of values corresponding to the region lying between the lines g—h. Curve U represents the operating characteristic obtained by decreasing the adjustable air gap 62 and curve V represents the operating characteristic obtained by causing the restricted section 61 to saturate at a substantially smaller value of magnetomotive force. Curve W of Fig. 7 represents the operating characteristic obtainable by designing the coils 75 and 76 to maintain the unidirectional magnetomotive force at different constant values in the region preceding the line g and in the region beyond the line h. By preventing variations in the amount of the unidirectional flux threading the yoke member 64 and the shunt saturable paths 65, 66 and 67, it is possible to maintain a substantially constant angular displacement between the voltages induced in windings 71, 72 and 73 and the voltages impressed on the associated anodes 35 for values of current in the direct current circuit 27 less than the value corresponding to the position of line g, and to provide a substantially constant phase displacement for values of current greater than the value corresponding to the position of line g. In this way there will be an abrupt shift in phase of the alternating voltages induced in windings 71, 72 and 73 for changes of current lying within the region g—h. The restricted section 63 serves to limit the amount of flux in the core member 60 and hence serves to limit the maximum shift in phase of the voltages induced in windings 71, 72 and 73 by limiting the amount of unidirectional flux which threads the saturable paths 65, 66 and 67.

In Fig. 8 there is shown another embodiment of my invention including a device 77 by means of which operating characteristics of the type shown in Fig. 7 may be obtained. Elements of the device 77 of Fig. 8 have been assigned like reference numerals corresponding to similar elements in the device 59 of Fig. 5. The device 77 includes a core member 78 which may be U-shaped and which has a restricted saturable section 79. Windings 80 and 81 are similarly disposed relative to each other and serve to impress on the core member 78 a unidirectional magnetomotive force and may be energized in accordance with one or more controlling influences. Winding 82 is associated with the core member 78 and serves to control the rate of change of flux in the core winding. The winding 82 may be short circuited through an adjustable resistance 83. Placed within the opening of the core member 78 and spaced apart therefrom, I provide a core member 84 having a restricted saturable section 85 and a plurality of saturable shunt paths 86, 87 and 88. The core member 84 is placed apart from the core member 78 so that air gaps 89 and 90 provide a means for limiting the unidirectional flux which passes from the core member 78 to the core member 84. The restricted saturable section 85 serves to limit the unidirectional magnetomotive force impressed on the shunt saturable paths 86, 87 and 88, and the restricted section 79 of core member 78 serves to limit the unidirectional magnetomotive force impressed on the core member 84 by the core member 78. Windings 75 and 76 are energized to oppose the magnetomotive force established by the windings 80 and 81 so that for magnetizations of the core member 78 below a predetermined value the greater portion of the flux will follow the path indicated by arrows j. For magnetizations of the core member 78 above the predetermined value, an appreciable flux will follow the path indicated by the arrows k so that an appreciable unidirectional flux threads the shunt saturable paths 86, 87 and 88.

The operation of the embodiment of my invention diagrammatically shown in Fig. 8 will be considered in connection with the operating characteristic shown in Fig. 7. If it be assumed that the windings 80 and 81 are energized by a direct current which varies in accordance with a predetermined controlling influence, such as the current of the direct current circuit 27 of Fig. 5, the phase of the voltage impressed on the control member 37 of electric valve means 34 relative to the voltage impressed on anode 35 will be substantially fixed, for values of curent below the value indicated by the position of line g. Under these conditions, the voltage induced in the winding 73 will depend primarily on the design of the core member 84 and the alternating magnetomotive force impressed thereon by the winding 70. When the magnetization of the core 78 remains below the predetermined value, there will be practically no unidirectional flux threading the shunt saturable paths 86, 87 and 88, the greater portion of the flux flowing through the path indicated by the arrows j. However, as the current in the windings 80 and 81 increases to a value above the predetermined value corresponding to the position of line g, the saturable restricted portion 85 of the core member 84 will become saturated causing a considerable portion of the unidirectional flux to follow the path indicated by the arrows k. In this way there will be superimposed on the alternating magnetomotive force due to winding 70 a unidirectional magnetomotive force to effect an abrupt shift in phase of the alternating voltage of peaked wave form induced in the winding 73, relative to the voltage impressed on winding 70. The windings 68, 69 and 70 and windings 71, 72 and 73 may be arranged or the energization thereof may be controlled so that this shift is either an advancement or a retardation. In the operating characteristics as shown in Fig. 7, the shift is shown as effecting a retardation in phase. The windings 75 and 76, since the magnetomotive forces of these windings oppose that of the windings 80 and 81 serve to maintain the angular displacement between the voltages induced in windings 71, 72 and 73 relative to the voltages impressed on windings 68, 69 and 70 substantially constant for values of load current lying below the line g and above the line h. In the range intermediate these values corresponding to the zone g—h where the restricted saturable section 85 becomes saturated, there is an abrupt shift in phase.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a core member, a source of alternating current, a winding connected to be energized from said source of alternating current for impressing on said core member an alternating magnetomotive force, a winding inductively associated with said core member for providing an alternating voltage of peaked wave form, a winding for impressing on said core member a unidirectional magnetomotive force, and a control winding for impressing on said core member a unidirectional magnetomotive force which opposes said first mentioned unidirectional magnetomotive force and which varies in accordance with a predetermined controlling influence to control the phase of said alternating voltage of peaked wave form relative to the voltage of said source.

2. In combination, a source of alternating current, a core member having a saturable portion, a winding connected to be energized from said source for impressing on said core member an alternating magnetomotive force, a winding associated with said saturable portion for providing an alternating voltage of peaked wave form, and means for controlling the phase of said alternating voltage of peaked wave form relative to the voltage of said source conjointly in accordance with two controlling influences comprising a control winding for impressing on said core member a unidirectional magnetomotive force in accordance with one of said controlling influences and a second control winding for impressing on said core member a unidirectional magnetomotive force in opposition to the first mentioned unidirectional magnetomotive force in accordance with the other of said controlling influences to control the resultant unidirectional magnetomotive force in said core member.

3. In combination, an alternating current circuit, and means for providing an alternating voltage of peaked wave form variable in phase relative to the voltage of said circuit in accordance with a predetermined controlling influence comprising a core member, a winding for impressing on said core member a magnetomotive force, a winding responsive to the resultant flux in said core member for providing said variable phase alternating voltage, a control winding for impressing on said core member a unidirectional magnetomotive force, a second control winding for impressing on said core member a unidirectional magnetomotive force of substantially greater magnitude than said first mentioned unidirectional magnetomotive force which opposes said first mentioned unidirectional magnetomotive force and which varies in magnitude in accordance with said controlling influence to control the resultant unidirectional flux in said core member to vary the times of the occurrence of the maximum instantaneous values of said voltage of peaked wave form.

4. In combination, a source of alternating voltage, an electric valve means having a control member, and means for controlling said electric valve means conjointly in accordance with two controlling influences comprising a core member, a winding connected to be energized from said source for impressing on said core member an alternating magnetomotive force, a control winding for impressing on said core member a unidirectional magnetomotive force variable in accordance with one of said controlling influences, a second control winding for impressing on said core member a second unidirectional magnetomotive force in opposition to said first mentioned unidirectional magnetomotive force and variable in accordance with the other of said controlling influences and a winding responsive to the resultant flux in said core member for impressing on said control member an alternating voltage variable in phase relative to the voltage of said source.

5. In combination, a pair of electric circuits, electric valve means having a control member, and means for controlling said electric valve means conjointly in accordance with two controlling influences comprising a core member, a winding connected to be energized from one of said circuits for impressing on said core member an alternating magnetomotive force, a control winding for impressing on said core member a unidirectional magnetomotive force variable in accordance with one of said controlling influences derived from one of said circuits, a second control winding for impressing on said core member a second unidirectional magnetomotive force in opposition to said first mentioned unidirectional magnetomotive force and variable in accordance with a controlling influence derived from the other of said circuits and a winding responsive to the resultant flux in said core member for impressing on said control member an alternating voltage variable in phase relative to the voltage of said one of said circuits.

6. In combination, an alternating current supply circuit, a load circuit, electric valve means having a control member interposed between said circuits for transmitting energy therebetween, and means for controlling an electrical condition of one of said circuits in accordance with two controlling influences comprising an inductive device having a core member, a winding connected to be energized from said supply circuit for impressing on said core member an alternating magnetomotive force, a control winding for impressing on said core member a unidirectional magnetomotive force variable in accordance with one of said controlling influences derived from said supply circuit, a second control winding for impressing on said core member a unidirectional magnetomotive force in opposition to said first mentioned unidirectional magnetomotive force and variable in accordance with the other of said controlling influences derived from said load circuit and a winding responsive to the resultant flux in said core member for impressing on said control member of said electric valve means an alternating voltage variable in phase relative to the voltage of said supply circuit to control said electric valve means.

7. In combination, an alternating current circuit, a direct current circuit, electric valve means having a control member interposed between said circuits for transmitting energy therebetween, and means for controlling the voltage of said direct current circuit conjointly in accordance with the voltage of said alternating current circuit and the current of said direct current circuit comprising an inductive device having a core member, a winding connected to be energized from said alternating current circuit for impressing on said core member an alternating magnetomotive force, a control winding for impressing on said core member a unidirectional magnetomotive force variable in magnitude in accordance with the voltage of said alternating current circuit, a second control winding for impressing on said core member a unidirectional magnetomotive force which opposes said first mentioned unidirectional magnetomotive force and which varies in magnitude in accordance with the current of said direct current circuit and a winding responsive to the resultant flux in said core member for impressing on said control member an alternating voltage variable in phase relative to the voltage of said alternating current circuit to control said direct current circuit.

8. In combination, a source of alternating current, a core member having a saturable portion, a winding for impressing on said core member an alternating magnetomotive force, a winding connected to be energized from said source for impressing on said core member a unidirectional magnetomotive force, a control winding for impressing on said core member a unidirectional magnetomotive force which opposes said first mentioned unidirectional magnetomotive force and which varies in accordance with a predetermined controlling influence, a winding associated with said saturable portion for providing an alternating voltage of peaked wave form the phase of which varies in accordance with the resultant unidirectional magnetomotive force in said core member, and means comprising a winding associated with said core member for controlling the flux in said core member to control the phase shift of said alternating voltage relative to the voltage of said source in accordance with the average difference of said unidirectional magnetomotive forces.

9. In combination, an alternating current circuit, a constant current direct current circuit, electric valve means having a control member interposed between said circuits, and means for controlling said electric valve means to maintain constant current in said direct current circuit comprising an inductive device having a core member, a winding connected to be energized from said alternating current circuit for impressing on said core member an alternating magnetomotive force, a winding for impressing on said core member a unidirectional magnetomotive force of substantially constant value, a control winding for impressing on said core member a unidirectional magnetomotive force of substantially greater value than said first mentioned magnetomotive force and which opposes said first mentioned unidirectional magnetomotive force and a winding responsive to the resultant flux in said core member for impressing on said control member an alternating voltage variable in phase relative to the voltage of said alternating current circuit to maintain the current in said direct current circuit at a substantially constant value.

10. In combination, a source of alternating current, a core member having a restricted saturable portion, a shunt saturable path bridging said restricted portion, a winding connected to be energized from said source for impressing on said shunt saturable portion an alternating magnetomotive force, a winding associated with said shunt saturable path for providing a voltage of peaked wave form, a winding for impressing on said core member a unidirectional magnetomotive force for controlling the phase of said alternating voltage, and a winding for impressing on said shunt saturable path a unidirectional magnetomotive force which opposes said first mentioned unidirectional magnetomotive force to control the phase of said alternating voltage of peaked wave form relative to the voltage of said source.

11. In combination, a source of alternating current, a core member including a section of nonlinear permeability and a shunt path bridging said section, a winding connected to be energized from said source for impressing on said core member an alternating magnetomotive force, a winding inductively associated with said shunt path for providing an alternating voltage, a control winding for impressing on said core member a unidirectional magnetomotive force to control the phase of said alternating voltage, and a winding for controlling the flux in said shunt path so that said alternating voltage is substantially fixed in phase for energizations of said control winding below a predetermined value and for effecting an abrupt change in phase of said alternating voltage relative to the voltage of said source for energizations of said control winding above said predetermined value.

12. In combination, a source of alternating current, a core member including a saturable section and a shunt path bridging said section, a winding connected to be energized from said source for impressing on said core member an alternating magnetomotive force, a winding inductively associated with said shunt path for providing an alternating voltage, a control winding for impressing on said core member a unidirectional magnetomotive force variable in accordance with a predetermined controlling influence to control the phase of said alternating voltage, and a winding for controlling the amount of flux in said shunt path so that said alternating voltage is substantially fixed in phase for energizations of said control winding above and below a predetermined range of values and for effecting an abrupt shift in phase of said alternating voltage relative to the voltage of said source for energizations of said control winding within said predetermined range of values.

13. In combination, a source of alternating current, a U-shaped core member, a winding for impressing on said core member a unidirectional magnetomotive force which varies in accordance with a predetermined controlling influence, a closed core member arranged within the opening provided by said U-shaped core member and spaced apart therefrom comprising a restricted saturable path and a second saturable path arranged in series relation with said first mentioned saturable path, a winding connected to be energized from said source for impressing an alternating magnetomotive force on said second core member, a winding responsive to the resultant flux in said second saturable path of said second mentioned core member for providing an alternating voltage variable in phase, and a winding associated with said second mentioned core member for maintaining substantially constant the unidirectional component of flux threading said second saturable path for values of said controlling influence below a predetermined value to maintain the phase of said alternating voltage substantially fixed for variations in said controlling influence below said predetermined value and for effecting an abrupt change in the value of the unidirectional component of flux threading said second mentioned saturable path to effect an abrupt shift in phase of said alternating voltage for values of said controlling influence above said predetermined value.

BURNICE D. BEDFORD.